Feb. 6, 1940.	T. C. NEWTON	2,189,434
LAWN MOWER
Filed Oct. 29, 1938
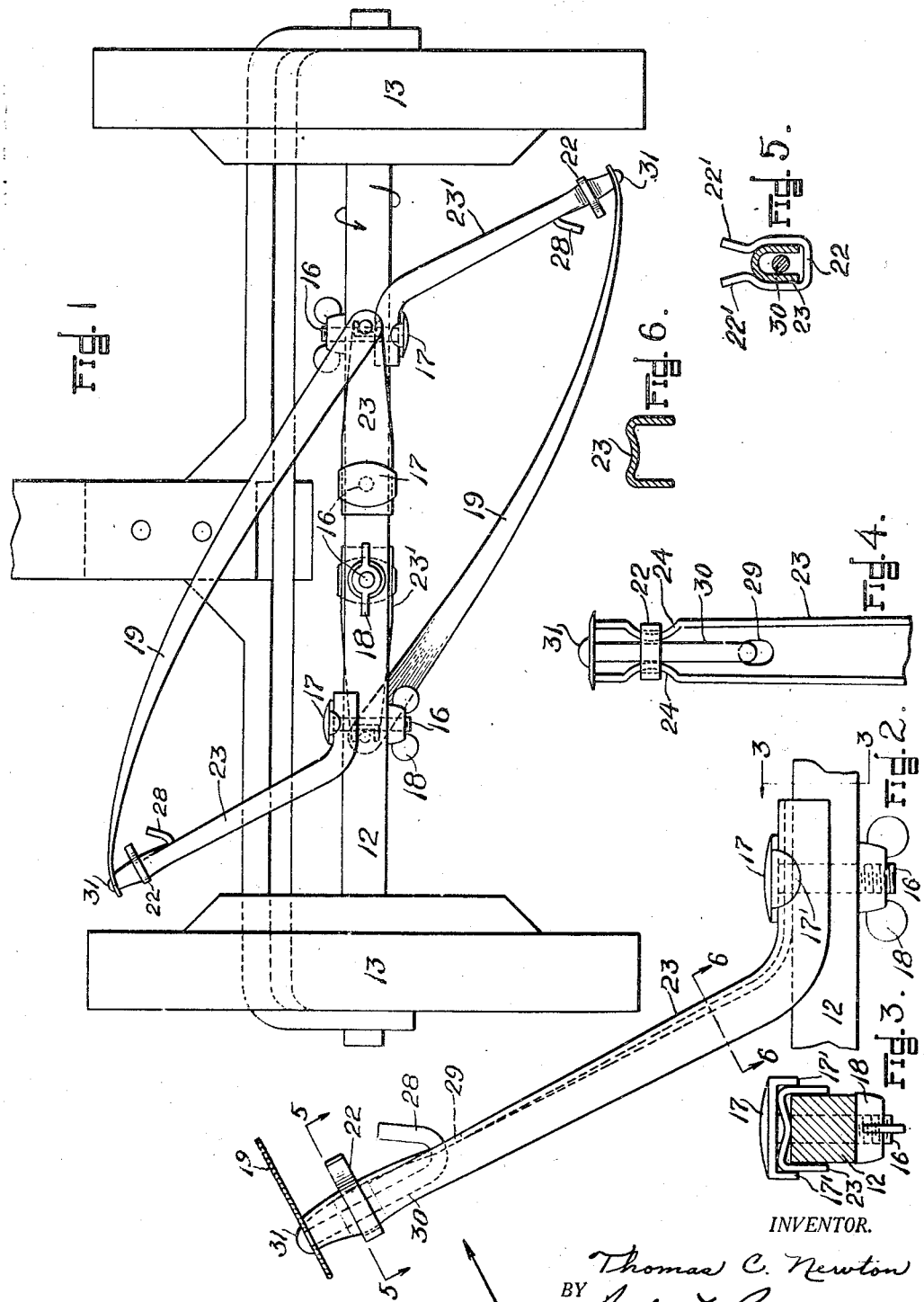
INVENTOR.
Thomas C. Newton
BY Arthur F. Randall
ATTORNEY.

Patented Feb. 6, 1940

2,189,434

UNITED STATES PATENT OFFICE 2,189,434

LAWN MOWER

Thomas C. Newton, Brookline, Mass.

Application October 29, 1938, Serial No. 237,698

4 Claims. (Cl. 56—294)

This invention relates to improvements in lawn mowers of the class or type shown and described in U. S. Letters Patent No. 1,918,349, granted July 18, 1933 to H. B. Newton et al. and it has for its object to improve the construction of lawn mowers of the class referred to.

More particularly the invention has for its object to improve the construction of the means by which the opposite ends of the flexible blades are secured to the spider arms which project from the rotatable axle of the reel.

To these ends I have provided certain improvements relating to lawn mowers of the class described as set forth in the following description, the several novel features of the invention being separately pointed out and defined in the claims at the close thereof.

In the accompanying drawing:

Figure 1 is a front elevation of a lawn mower embodying my improvements.

Figure 2 shows a portion of the rotatable axle with a spider arm attached thereto.

Figure 3 is a section on line 3—3 of Fig. 2.

Figure 4 is an elevation of one side of the upper end portion of the spider arm shown in Fig. 2 as viewed in the direction of the arrow in the latter figure.

Figure 5 is a section on line 5—5 of Fig. 2.

Figure 6 is a section on line 6—6 of Fig. 2.

In the drawing, 12 designates an axle supported and adapted to be rotated by traction wheels 13 loosely and rotatably mounted upon the opposite end portions of the axle, any suitable motion transmitting mechanism being provided through which the wheels 13 when rotated act to rotate the axle 12 in the direction of the arrow during forward movement of the mower.

Two pairs of spider arms 23 and 23' are detachably secured to the axle 12 by clamping bolts 16 each having a thumb nut 18 mounted thereon. The arms 23 project laterally from the axle with the arms of each pair relatively disposed angularly ninety degrees apart and said arms are inclined, that is said arms are disposed obliquely relatively to the axis of shaft 12. To the arms of each pair are fastened the opposite ends of a flexible steel blade 19 and, as usual, the blade is maintained in a spiral form by its two arms.

The arms 23 are U-shaped in cross section, as shown in Fig. 6, and its inner horizontally disposed end portion straddles the shaft 12 and is rigidly clamped thereto by its bolt 16, said bolt being provided with a head 17 provided at its opposite sides with ears 17' which embrace the horizontal portion of the arm and hold the bolt against rotative displacement when its nut 18 is being operated.

As in the above noted patent each end of each blade 19 is fastened to its arm 23 by a hook member which may be made from round wire and formed at one end with a hook 28 and at its opposite end with a head 31, the shank portion 30 of the hook member being straight and occupying a position within the upper end of its arm 23, as shown in Figs. 2, 4 and 5. As shown in the above noted patent each blade 19 is made at its opposite ends with apertures which are occupied by the shank portions 30 of the hook members by which it is connected with its pair of arms 23 or 23' and, as in said patent, the hook 28 of each hook member occupies an aperture 29 formed through the intermediate web portion of its arm 23, or 23', near the upper end thereof.

Through use of lawn mowers thus constructed it has been found that when one of the blades 19 is broken it often happens that the hook members are lost which of course is an objectionable feature of considerable importance. In carrying out the present invention I had in view to prevent the loss of the hook members when a blade breaks and to this end I provide each arm 23 with a keeper herein shown as a girdle 22 consisting of a metal tape which is bent around the upper end portion of the arm 23 within which the hook member thereof is located and whose opposite end portions are pinched toward each other so that the girdle is held itself against lateral displacement on its arm 23. In order to hold the girdle against longitudinal displacement on its arm 23 the flanges of the latter are formed at opposite sides thereof with indentations or recesses 24 within which the girdle is contracted. Obviously the walls of these recesses 24 hold the girdle against any substantial longitudinal movement on its arm.

It will be clear that should a blade break the girdles 22 of its arms 23, or 23', will hold the hook members of said arms within the latter. When a new blade is to be substituted for a broken one the legs 22' are spread apart manually far enough to permit removal of the girdle then the hook members are removed from their arms and the fragments of the broken blade are removed from the hook members and the latter are applied to the new blade after which the hook members are reengaged with their arms and the girdles 22 restored to their normal positions and condition upon the latter. Thus each girdle 22 is a strip of pliable sheet metal, such as soft iron, lead or the like, and can be used in association with many different blades.

From the above description it should be clear that each hook member and the proximate end of its steel blade 19 mutually coact normally to hold each other in their normal positions.

Each spider arm 23 and 23' is made from sheet metal so that it is U-shaped in cross section throughout its length and this construction provides a pocket within which the shank portion 30 of its hook is housed as shown in Figs. 2 and 5.

The hook members 28—30—31 are substantially the same as the corresponding elements of the lawn mower shown and described in the above noted patent.

What I claim is:

1. In a lawn mover of the class described the combination of an arm projecting laterally from the reel shaft of the mower, the outer end portion of said arm being made U-shaped in cross section to provide the same with a longitudinal recess; a blade-holding hook member housed within said recess, said hook member being separably and directly interlocked with said arm and adapted to engage one end of a flexible cutting blade to hold the latter in spirally flexed condition against the outer extremity of said arm, and a stiffly pliable metallic girdle extending around the recessed portion of said arm so as to hold said hook member within said recess and in interlocked engagement with said arm, said girdle being manually expansible to free it for removal from said arm.

2. The combination of claim 1 wherein said girdle is formed with free opposite ends bent toward each other into close proximity so that the said girdle holds itself against displacement laterally on said arm.

3. In a lawn mower of the class described the combination of a blade-holding arm projecting laterally from the reel shaft of the mower, the outer end portion of said arm being made at one side thereof with a longitudinal recess; a hook member having a shank portion housed within said recess, said shank portion being provided at its one end with a hook occupying a transverse aperture provided through said arm and at its opposite end with a head for engaging the outer side of a flexible cutting blade so as to hold the latter in spirally flexed condition against the outer extremity of said arm; a removable girdle extending around the recessed portion of said arm so as to confine said member within said recess, and means on said arm for normally holding said girdle against longitudinal displacement thereon in either direction.

4. In a lawn mower of the class described the combination of an arm projecting laterally from the reel shaft of the mower, the outer end portion of said arm being made at one side thereof with a longitudinal recess and upon its exterior and at opposite sides of said recess with indentations; a blade-holding hook member having a shank portion housed within said recess which is provided at its one end with a hook occupying a transverse aperture provided through said arm and at its opposite end with a head adapted to engage the outer side of a flexible cutting blade to hold the latter in spirally flexed condition against the outer extremity of said arm, and a removable metallic girdle extending around the recessed portion of said arm so as to confine said hook member within said recess and occupying said indentations so that it is held against longitudinal displacement on said arm, said girdle consisting of a bent strip of stiffly pliable metal having free opposite ends bent toward each other into close proximity so as to hold itself against displacement laterally on said arm.

THOMAS C. NEWTON.